United States Patent [19]

Sahai

[11] Patent Number: 5,442,275
[45] Date of Patent: Aug. 15, 1995

[54] BATTERY CHARGING CIRCUIT AND ELECTRONIC DEVICE INCLUDING THE SAME

[75] Inventor: Hitoshi Sahai, Kyoto, Japan

[73] Assignee: Rohm Co., Ltd., Kyoto, Japan

[21] Appl. No.: 117,949

[22] Filed: Sep. 8, 1993

[30] Foreign Application Priority Data

Sep. 10, 1992 [JP] Japan .................. 4-266826

[51] Int. Cl.$^6$ ............................................. H02J 7/10
[52] U.S. Cl. .......................................... 320/39; 320/20
[58] Field of Search ................... 320/20, 39, 30, 38

[56] References Cited

U.S. PATENT DOCUMENTS

| 4,583,034 | 4/1986 | Martin | 320/21 |
| 4,649,333 | 3/1987 | Moore | 320/31 |
| 4,820,965 | 4/1989 | Siemer | 320/31 |
| 5,150,031 | 9/1992 | James et al. | 320/2 |
| 5,172,044 | 12/1992 | Sasaki et al. | 320/22 |

FOREIGN PATENT DOCUMENTS

93/19508  9/1993  WIPO ................... 320/39

Primary Examiner—Steven L. Stephan
Assistant Examiner—Robert Napp
Attorney, Agent, or Firm—Fay, Sharpe, Beall, Fagan, Minnich & McKee

[57] ABSTRACT

The constitution of a battery charging circuit uses a power source circuit which performs a charging operation for the battery, and a current-voltage converting circuit inserted in series with the battery which, when assuming the amount of charging current of the battery for the abscissa and assuming the amount of voltage obtained by converting the amount of charging current into a voltage for the ordinate, shows a first current-voltage converting characteristic having a positive inclination in a range of a charging current amount representing a condition of a charging completion and shows a second current-voltage converting characteristic having a smaller positive inclination than that for the first current-voltage converting characteristic in a range of a charging current amount exceeding the above range and converts the above charging current amount into a voltage amount, and the converted voltage amount is further A/D converted into a digital value, and an over current charging condition and a charging completion condition are respectively detected based on the digital value.

2 Claims, 3 Drawing Sheets

BATTERY CHARGING CIRCUIT AND ELECTRONIC DEVICE INCLUDING THE SAME

BACKGROUND OF THE INVENTION

1. Field of the Invention

The present invention relates to a battery charging circuit and an electronic device including the same, and more specifically, relates to a battery charging circuit such as for a lithium ion battery (hereinbelow called as LI battery) which is adapted to detect a condition of over current charging and a condition of charging completion by making use of a microprocessor and an A/D converter allowing a large charging current even when a converting bit number of the A/D converter is small.

2. Description of Related Art

In electronic devices such as office automation (OA) devices including a lap-top-computer and audio visual (AV) devices including a video camera, a LI battery is loaded for the purpose of a battery back-up or a battery drive. The LI battery is charged either when the output is lowered due to its electron charge discharge or periodically.

Generally, a constant voltage and constant current power source is used for charging such as the LI battery and when the battery restores to a predetermined voltage via charging, the charging current gradually decreases depending upon progress of charging. In such charging operation, there are two cases, one, the charging is started from a condition that the substantial electric charges in the battery have been discharged, the other from a condition that little electric charges in the battery have been discharged. In the former case, the charging is performed at first by flowing a constant current of about 1A. In the latter case or in a condition wherein a charging operation has advanced to a certain extent, the charging is performed at a constant voltage other than at a constant current in relation to the restored voltage of the battery under charging and in such instance the charging current gradually decreases. Under the constant voltage charging, when the charging current reduces, for example, below about 5 mA or when the charging current reduces, for example, blow about 300 mA and the charging time under the constant current charging exceeds a predetermined time, it is judged that a sufficient charging is performed for the battery and the charging operation is terminated. Then completion of charging is indicated to notice the termination of the charging.

FIG. 6 shows one example of conventional battery charging circuits performing the above explained control.

A controller 1 includes such as a microcomputer and, at the start of charging operation, sends out a control signal A to a regulator 2. For the regulator 2 a constant voltage constant current power source circuit is usually used and the regulator 2 begins a charging operation in response to the control signal A and carries out either a constant current charging operation or a constant voltage charging operation and a charging current B is supplied to a battery 3 such as a LI battery via a diode $D_o$.

The charging current B also flows through a resistor R inserted between the battery 3 and a grounding line. The resistor R constitutes a current-voltage converting circuit 4 which converts the value of the charging current B into a voltage signal C. The voltage signal C is applied to an A/D converter (A/D) 5 and is converted there into a digital signal D and inputted to the controller 1. Herein, the resistor R1 and the A/D 5 constitute a detecting circuit of the charging current value for the controller 1.

The controller 1 monitors the magnitude of the charging current B based on the amount of the digital signal D and terminates the transmission of the control signal A when the amount of the digital signal reduces below a predetermined value representing completion of charging. As a result, the regulator 2 terminates the supply of the charging current B. Further, the controller I operates as a protection circuit for detecting an over current charging, in that, when an over current exceeding a predetermined amount is detected through a continuous monitoring of a signal inputted from the A/D 5 during charging operation, the control signal A is ceased and the operation of the regulator is terminated.

This protecting operation is indispensable for performing a safe charging operation with these kinds of charging circuits. For fulfilling the above demand, the controller including such as the microcomputer necessitates an A/D converter which convertes a current value during the charging operation into a digital value.

A charging current detecting range with the controller 1 is usually from a few mA to a maximum of about 1 A. For this reason, in the above indicated condition the A/D converter is required to have a resolution below 5 mA and a convertible range equal to or more than 1 A, and for meeting this requirement an A/D converter having equal to or more than 8 bits is required.

However, recently, a demand of a high speed charging is increasing as well as an upper limit of charging current tends to exceed over 1 A. For coping these demands and in view of an over current charging detection, the bit number of the A/D converter has to be further increased, thereby an A/D converter having 10~16 bits is necessitated.

However, a cost of a high accuracy A/D converter having many bit number is high, so that such A/D converter is hardly used for a charging circuit having a severe cost limitation. Further, the internal wiring lines thereof increase in accordance with the bit number increase and such is insuitable for a battery charging circuit used in electronic devices such as portable electronic devices having an intense down-sizing requirement. Still further, when the circuit is formed into an IC, an integration of other circuits is made difficult in proportion to the increase of the wiring lines.

SUMMARY OF THE INVENTION

An object of the present invention is to provide a battery charging circuit such as for a LI battery which allows a high speed charging even with an A/D converter having a small bit number.

Another object of the present invention is to provide a small sized electronic device having a battery charging circuit which allows a high speed charging.

The constitution of the battery charging circuit according to the present invention which achieves the above objects uses a power source circuit which performs a charging operation for a battery, and a current-voltage converting circuit inserted in series with the battery which, when assuming the amount of charging current of the battery for abscissa and assuming the amount of voltage obtained by converting the amount of charging current into a voltage for ordinate, shows a first current-voltage converting characteristic having a positive inclination in a range of a charging current amount for detecting a condition representing a charging completion and shows a second current-voltage converting characteristic having a smaller positive inclination than that for the first current-voltage converting characteristic in a range of a charging current amount exceeding the above range and converts the above charging current amount into a voltage amount, and the converted voltage amount is further A/D converted into a digital value, and an over current charging condition and a charging completion condition are respectively detected based on the digital value.

Further, in the above battery when the charging voltage restores to a predetermined amount, the charging current gradually decreases in accordance with the progress of the charging, of which characteristic such as a LI battery shows.

In the battery charging circuit having such constitution, the current-voltage converting circuit converting the charging current amount into a voltage before an A/D conversion converts the charging current into a voltage base on the characteristic having a predetermined positive inclination when the charging current amount is small. Accordingly, in a small current region wherein the completion of charging is judged, a detection of charging current amount with a high accuracy can be performed depending on the set positive inclination. Further, although the high accuracy detection is performed with a large voltage conversion rate by increasing the inclination, the current amount to be A/D converted is limited in a small current region so that an A/D converter having a small bit number can be used.

On the other hand, in an intermediate and a large current region, the voltage conversion characteristic is selected to have a further smaller positive inclination than the previous one, the voltage conversion rate reduces and the detection accuracy drops. However, in the intermediate and the large current regions the purpose of the detection is principally placed on the over current protection, it is possible to detect an over current charging even when the current monitoring accuracy is not set so high. Moreover, with this constitution, the current-voltage conversion can be extended over a range of larger current amount with a smaller bit number as a whole and a further large over current charging can be detected.

Accordingly, even if the conversion bit number of the A/D converter is small, a monitoring can be performed over a wide range of charging current as well as a high accuracy detection of charging current can be performed for the judgement of completion of charging.

DESCRIPTION OF THE PREFERRED EMBODIMENTS

Figure 4:
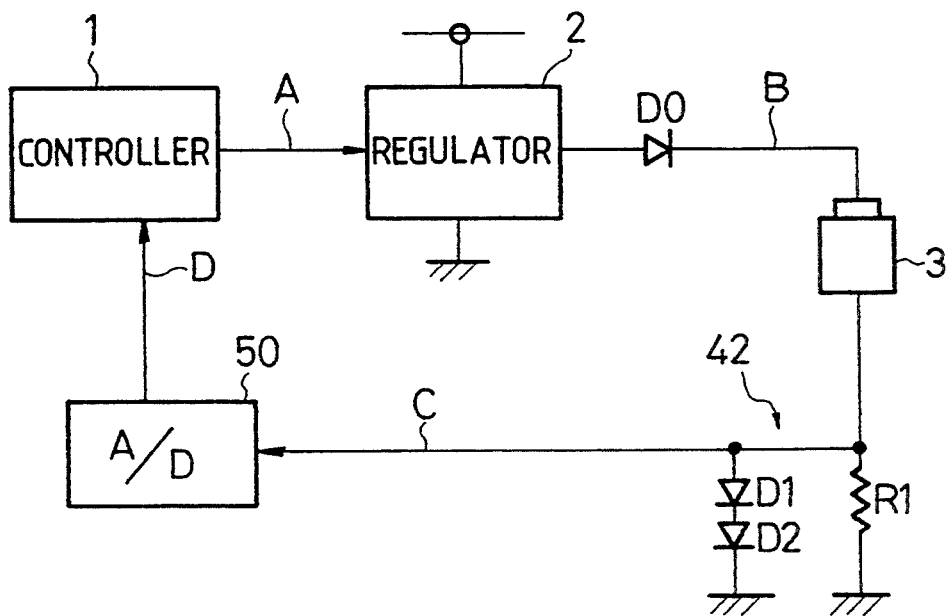
FIG. 4 is a block diagram of a still another embodiment of battery charging circuits according to the present invention.
Figure 5:
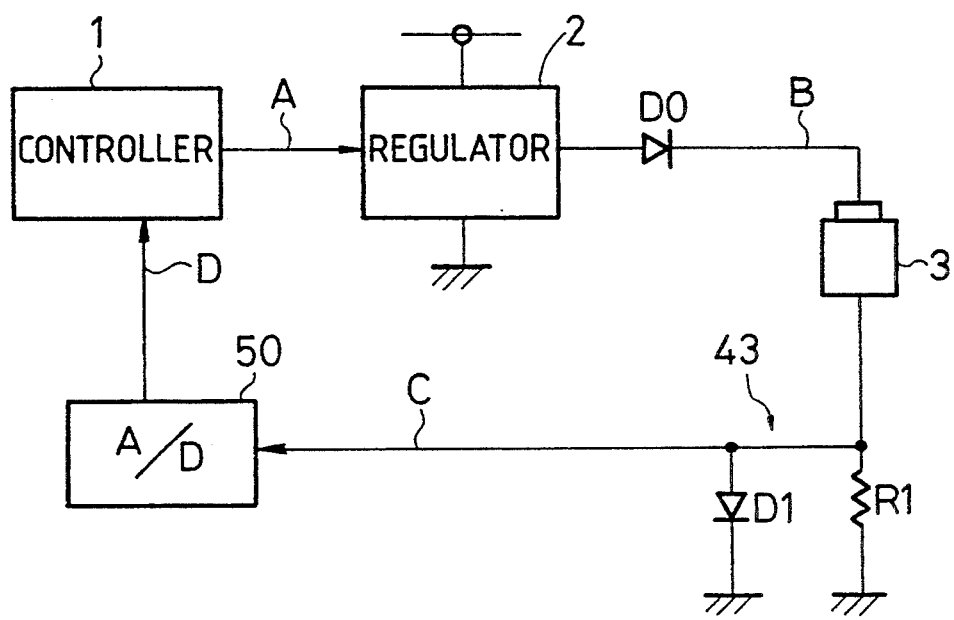
FIG. 5 is a block diagram of a further embodiment of battery charging circuits according to the present invention.
Figure 6:
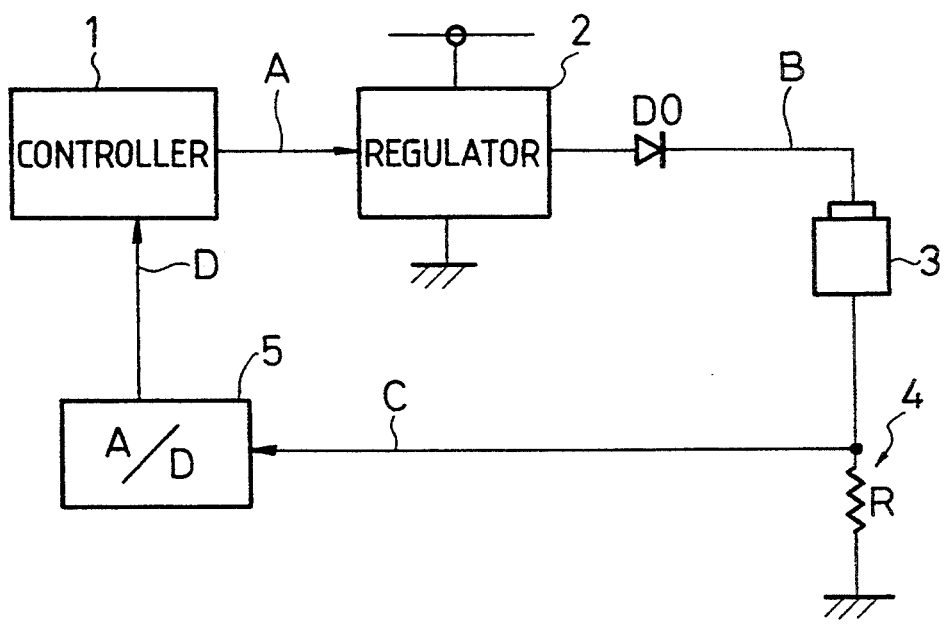
FIG. 6 is a block diagram of a conventional battery charging circuit.

The same or equivalent constitutional elements in FIG. 1 through FIG. 5 as those in FIG. 6 are designated by the same reference numerals or characters. Accordingly, the explanation of those elements is omitted. Difference between the arrangements shown in FIG. 1 through FIG. 5 and one shown in FIG. 6 are respectively in the provisions of current-voltage conversion circuits 40, 41, 42 and 43 in place of the current-voltage conversion circuit 4 shown in FIG. 6. Further, in the arrangements in FIG. 1 through FIG. 5 an A/D converter 50 is provided in place of the A/D converter 5 shown in FIG. 6. However, when the A/D 5 is 8 bits A/D, the A/D 5 shown in FIG. 6 can be used as the A/D 50. In the present invention, even when the same A/D as the conventional one is used, a larger amount of charging current than the conventional one can be applied during a constant current charging operation. In the current-voltage conversion circuit 40 in FIG. 1 a series circuit of resistors R2 and R3 and a zenor diode Z1 is connected in parallel with the resistor R1 inserted between the battery 3 and ground line. The voltage appearing the junction point N between the resistors R2 and R3 is sent out to the A/D 50 as the voltage signal C.

Figure 2:
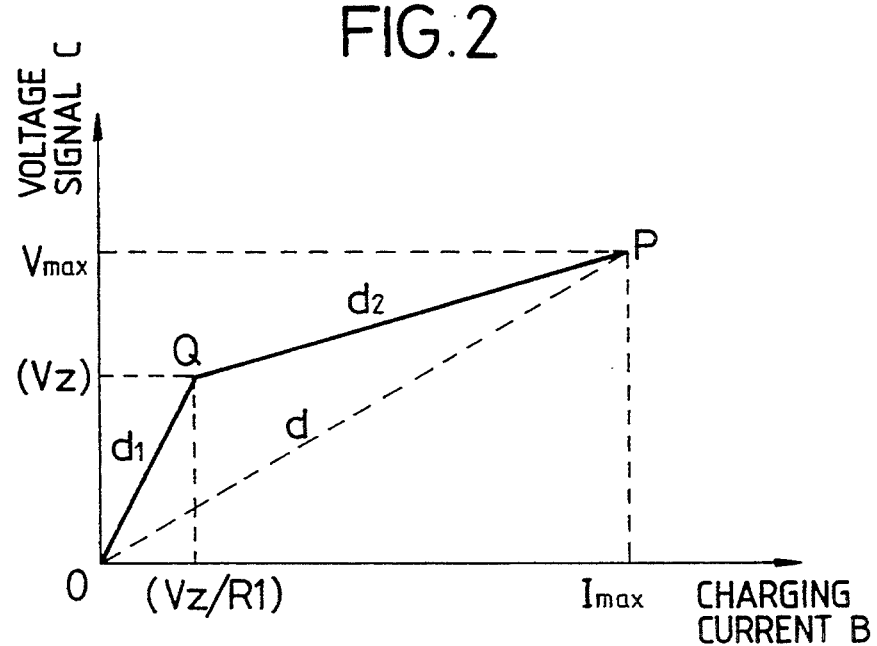
FIG. 2 is a graph of a current-voltage conversion characteristic of the battery charging circuit of FIG. 1.

As indicated previously, when the discharging amount of electric charges in the battery 3 is small or when the charging operation comes close to its completion, the charging current B is small. In such instances, the voltage appearing at the terminal of the resistor R1 is also low. The resistance value of the resistor R1 is set in such a manner that with the terminal voltage of the resistor R1 appearing at such instances the zenor diodes Z1 is never rendered conductive. With such setting, the current-voltage conversion rate under such small charging current is solely determined by the resistance value of the resistor R1. As a result, a conversion characteristic d1 due to the resistance value of the resistor R1 as shown in FIG. 2 is obtained. In the drawing, Vz represents a limit terminal voltage of the resistor R1 below which the zenor diode Z1 is maintained non-conductive.

FIG. 2 illustrates the current-voltage conversion characteristic wherein abscissa represents the amount of charging current and ordinate represents the voltage amount when the charging current amount is converted into a voltage. The dotted line d represents a straight line connected between a point P wherein the maximum current amount Imax representing an over charging current is converted into a voltage amount Vmax and the origin O of the present coordinate system. The inclination of the straight line of the characteristic d1 shows a larger inclination than that: of the straight line d and the inclination for the characteristic d2 shows a smaller inclination than that of the straight line d. A voltage range to be A/D converted is one from "O" to a voltage amount Vmax+α. Wherein a is a margin of the A/D conversion in relation to the detection value of the over charging current. A maximum charging current is set at a certain value below this current value Imax.

Now, when the charging amount of electric charges of the battery 3 is large, the charging current B is large. At this moment, the voltage appearing at the terminal of the resistor R1 becomes higher than the limit terminal voltage Vz. When the terminal voltage between the resistor R1 is higher than Vz, the zenor diode Z1 is rendered conductive. Accordingly, the current-voltage conversion rate is primarily determined by a current division ratio defined by the resistance value of the resistor R1 and the combined resistance value of the resistors R2 and R3, and by a voltage division ratio defined by the resistance values of the resistors R2 and R3. The resultant conversion rate determined by the current division and voltage division ratios is small in comparison with the instance determined only by the resistor R1. As a result, the characteristic d2 as shown in FIG. 2 is obtained.

The A/D 50 is an A/D converter of 8 bits and divides the range of the voltage signal C into 256 sections and generates a digital signal D covering numerals of 0~255. When exemplifying a specific example in case of a LI battery, the resistance of the resistor R1 is 6 Ω, the resistances of the resistors R2 and R3 are both 3 Ω and the conduction initiating voltage of the zenor diode Z1 is 2.5 V. In this instance when assuming a pitch of conversion voltage of the A/D converter 50 as 0.02 V, the following result is theoretically obtained.

Namely, for the charging current 0A a voltage signal C of 0 V is obtained and a digital signal D of "0" is determined. For the charging current 50 mA a voltage signal C of 0.3 V is obtained and a digital signal D of "15" is determined. For the charging current 0.42 A a voltage signal C of 2.5 V is obtained and a digital signal D of "125" is determined. Hereinafter, the zenor diode Z1 becomes conductive. For the charging current 1A a voltage signal C of 4 V is obtained and a digital signal D of "200" is determined. However, in an actual operation, the voltage at the zenor diode Z1 slightly increases depending upon an increase of current amount, the charging voltage amount becomes slightly large with respect to the charging current value. Accordingly, the numeral value of the above digital signal D also becomes somewhat larger than that indicated above.

Now, in the present circumstance, when such a condition is assumed that the charging current is below a predetermined current value under a constant voltage charging condition and the charging time exceeds a predetermined time, namely assuming that the monitoring current value representing a completion of charging operation is, for example, below 300 mA and the above mentioned predetermined time is about 40 minutes, the resistance value of the resistor R1 has to be selected in such a manner that the crossing point Q of the characteristic lines d1 and d2 comes above the predetermined current value of 300 mA. In the present example, the current value at the crossing point Q is determined at Vz/R1≈420 mA.

Further, in the region of characteristic d1 showing a small charging current in the above case, a resolution of about 3 mA is obtained, and in the region of characteristic d2 showing an intermediate and large charging current, a resolution of about 8 mA is obtained. As a result, a charging current from about 3 mA to an upper limit of 1.3 A or more can be detected after converting with a 8 bit A/D converter, of which accuracy and the covering range could be achieved in conventional circuits only by making use of more than 9 bit A/D converter. According to the present invention, such accuracy and the covering range can be realized by making use of a 8 bit A/D converter. Although the difference between 8 bits and 9 bits is only one bit, however the difference is significant because the covering number of the A/D converter usually reaches to a multiple number of 4 bits through 8 bits in relation to processing as digital values.

Now, the general operation of the circuit is explained, first at a charge initiation point the controller 1 sends out a control signal A to the regulator 2. The regulator 2 which has received this signal begins a high speed charging, for example, at a constant current of 1.25 A for the battery 3. When a voltage of the battery 3 restores to a predetermined value through this charging operation, the operation of the regulator 2 shifts from the constant current charging to a constant voltage charging. During these charging processes the charging current B is always detected in a form of voltage signal C by the current-voltage converting circuit 40 and the detected voltage signal C is inputted via the A/D 50 to the controller 1 in a form of digital signal D to thereby perform a continuous monitoring by the controller 1.

The controller 1 judges that the charging has been completed when the value of the digital signal D becomes, for example, equal to or less than "2", in other words when the charging current becomes equal to or less than about 6 mA and terminates the transmission of the control signal A. Thereby, the regulator 2 terminates the supply of the charging current B to the battery 3. Further, when a condition wherein a value of digital signal D, for example, is below "170" continues for more than 40 minutes, the controller also judges that the charging has been completed and terminates the transmission of the control signal A.

Further, when a value of digital signal D during charging operation exceeds, for example, 235, in other words when the charging current exceeds more than 1.35 A, the controller 1 judges an abnormal charging due to over current charging and terminates the transmission of the control signal A so as to protect such as the regulator 2 and the battery 3 from an abnormal circumstance. Thereby, the regulator 2 terminates the charging current B.

Further, when the inclination of the characteristic line d2 in FIG. 2 is further reduced a further large over current charging can be detected.

Accordingly, the controller 1 performs such functions as the detection of charging completion for the battery and the following automatic charging termination, and the emergency termination through abnormal detection such as the over current charging detection.

Figure 1:
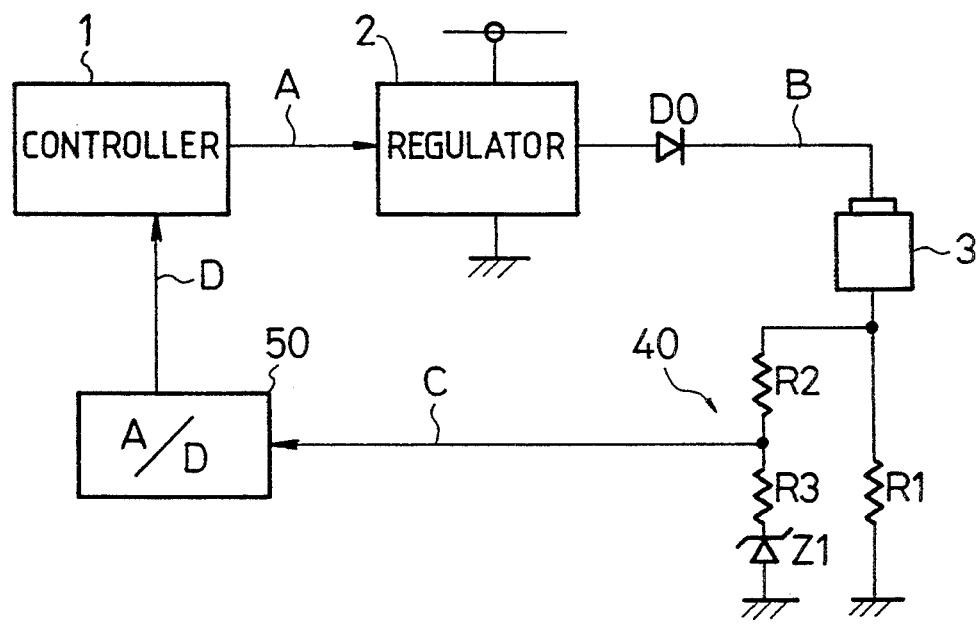
FIG. 1 is a block diagram of one embodiment of battery charging circuits according to the present invention.
Figure 3:
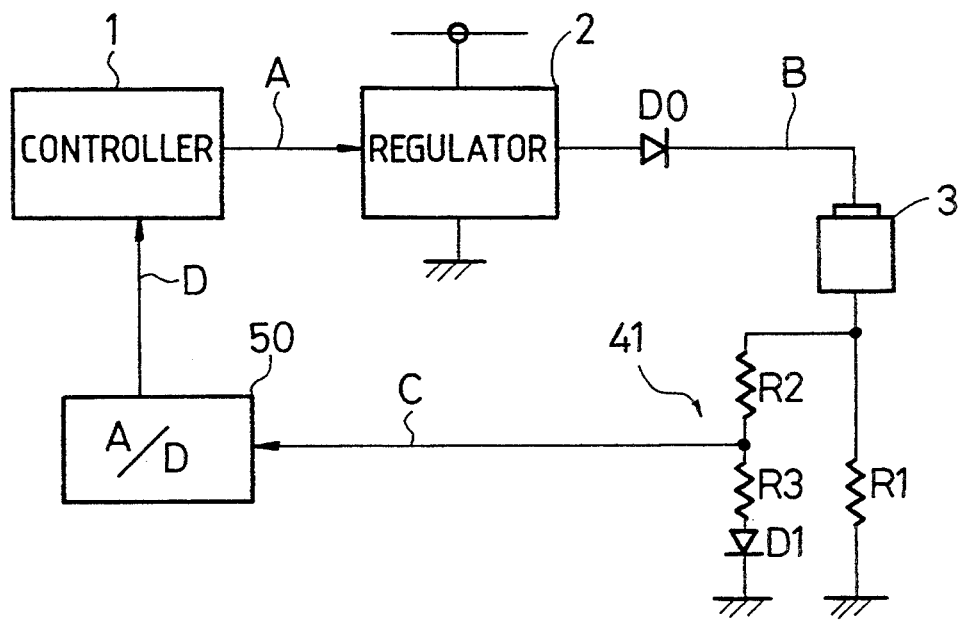
FIG. 3 is a block diagram of another embodiment of battery charging circuits according to the present invention.

In FIG. 3 embodiment, the zenor diode Z1 in FIG. 1 is replaced by a diode D1, however the operation of FIG. 3 embodiment is substantially the same as that of FIG. 1 embodiment.

In FIG. 4 embodiment, a series circuit of diodes D1 and D2 is provided in parallel with the resistor R1. Further, in FIG. 5 embodiment, the diode D2 in FIG. 4 is eliminated and a single diode D1 is connected in parallel with the resistor R1.

These embodiments shown in FIG. 4 and FIG. 5 make use of a non-linear current-voltage characteristic of the diodes. Namely, when the terminal voltage of the resistor R1 exceeds a voltage which turns "ON" the diode D1 or the combination of the diodes D1 and D2, the voltage value of the voltage signal C is determined by a current value flowing through the diode D1 or the combination of the diodes D1 and D2 and a non-linear current-voltage conversion can be performed. Accordingly, a detectable limit value of over current charging can be extended. As a result, a larger charging current than the conventional one can be flowed with an 8 bit A/D converter. Further, the current-voltage converting characteristic of the circuits shown in FIG. 3 through FIG. 5 is modified into a non-linear characteristic in connection with the linear characteristic d2 in FIG. 2 and the inclination thereof further is reduced, however the operation of the respective circuits ,are substantially the same, therefore the explanation thereof is omitted.

I claim:

1. A battery charging circuit which converts a value of charging current flowing through a battery into a voltage value, A/D converts the converted voltage value into a digital value and detects an over current charging condition and a charging completion condition respectively based on the converted digital value comprising:

a power source circuit for charging said battery;

a current voltage conversion circuit inserted in series with said battery which, when assuming a voltage value to charging current ratio, shows a first current-voltage conversion characteristic having a first positive value of the ratio in a first range of charging current value representing the charging completion condition and further shows a second current-voltage conversion characteristic having a second smaller positive ratio value than that of the first current-voltage conversion characteristic in a range of charging current value exceeding the first range;

an A/D converter circuit which A/D converts the converted voltage value by said current-voltage conversion circuit;

a controller which detects respectively the over current charging condition and the charging completion condition upon receipt of an output from said A/D converter circuit and terminates the charging operation of said power source circuit when one of these conditions is detected;

wherein the first current-voltage conversion characteristic is linear and the first ratio value thereof is set larger than a third ratio value defined by a ratio of the voltage value to the charging current between a minimum value of the charging current to a current value representing an over current charging condition, and the second ratio value of the second current-voltage conversion characteristic is set smaller than that of the third ratio value and wherein when a voltage of said battery restores to a predetermined voltage value, the charging current gradually decreases in accordance with the advance of the charging operation; and wherein said current-voltage conversion circuit includes a series resistor inserted in series with said battery and a diode connected in parallel with said series resistor, the first current-voltage conversion characteristic is substantially determined by the resistance value of said series resistor and the second current-voltage characteristic is substantially determined by a condition when said diode is turned "ON"; and further wherein a series circuit of a plurality of resistors connected in series is provided between said battery and said diode and the voltage value is taken out from the junction point of the plurality of the resistors in said series circuit.

2. A battery charging circuit according to claim 1, wherein said diode is a Zener diode, said A/D converter circuit is a 8 bit A/D converter, said controller includes a microprocessor and said power source circuit is a constant voltage and constant current charging circuit.

* * * * *